United States Patent Office 2,797,200
Patented June 25, 1957

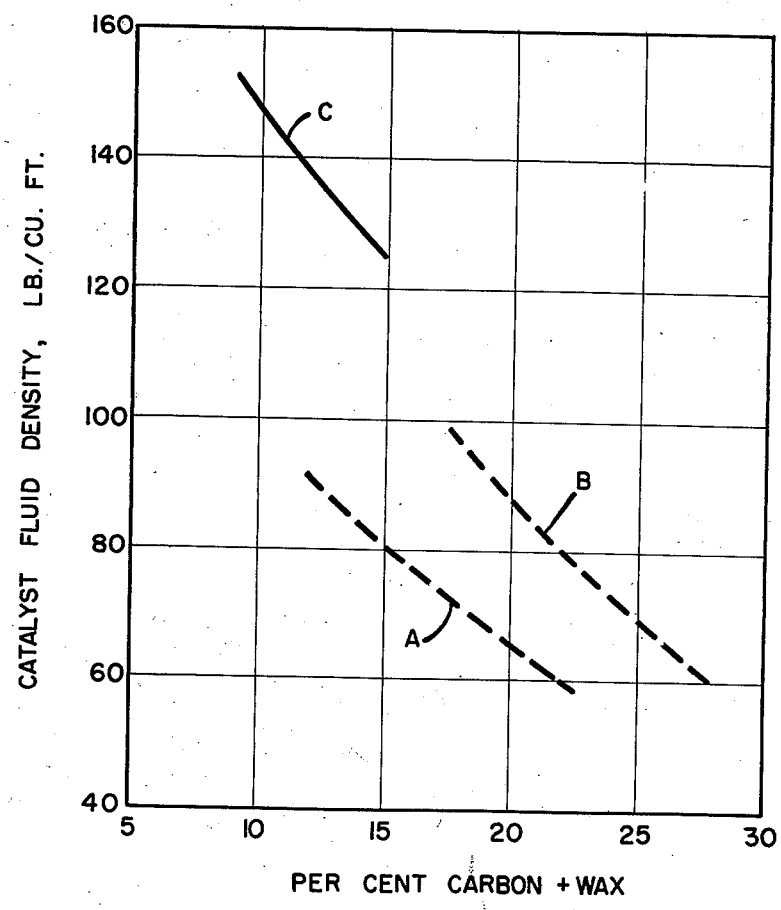

2,797,200
METHOD FOR PROMOTING HYDROCARBON SYNTHESIS CATALYST

Franklin T. Barber, Bartlesville, and Roscoe F. Vandaveer, Tulsa, Okla., assignors to Pan American Petroleum Corporation, a corporation of Delaware Application January 16, 1953, Serial No. 331,656

14 Claims. (Cl. 252—474)

The present invention is related to the preparation and treatment of catalysts. More particularly, it is concerned with catalysts of the type employed in the synthesis of hydrocarbons from carbon monoxide and hydrogen. Specifically, our invention is directed to the preparation of a finely-divided iron catalyst activated by added alkaline promoters and adapted for contacting gasiform fluids in a dense, turbulent suspended phase. More specifically, our invention relates to a particular procedure or sequence of steps for adding promoter to the catalyst.

The use of alkali-promoted iron catalysts in the synthesis of hydrocarbons from carbon monoxide and hydrogen is now well-established. However, attempts to apply the fluidized-solids technique to such a process have not met with unqualified success, particularly with respect to the numerous problems encountered in catalyst fluidization, product distribution and catalyst activity.

Accordingly, it is an object of our invention to provide a method for treating the catalyst prior to use so that good fluidization and desirable product distribution can be achieved. Another object of our invention is to provide a method for preparing a catalyst of relatively high activity.

The presence of fines in the dense, turbulent suspended phase is generally desirable for ease of fluidization. Therefore, it is usually desirable that the finely-divided catalyst as charged to the reactor include a certain proportion of relatively-large, intermediate and relatively-fine particles. Conventionally finely-divided iron catalyst for hydrocarbon synthesis is promoted by slurrying the catalyst with a water solution of an alkali promoter such as $K_2CO_3$ and decanting the excess solution. By this method, the final promoter content of the catalyst is dependent upon the concentration of the initial promoter solution and the extent of solution retention by the catalyst.

One objection to this method of applying alkali promoters to powdered iron catalyst is that the catalyst must be permitted to settle before the excess solution can be decanted, and this seriously limits the amounts of catalyst which can be activated by a given apparatus. Furthermore, the retention value of the catalyst usually varies from a small batch to a large batch, and there is therefore no reproducibility of a uniform catalyst of known or desired activity. It is, therefore, an object of this invention to provide a system wherein a catalyst promoter is distributed uniformly throughout a mass of divided particles.

In general, according to one phase of our invention, the above difficulties are voided and uniform distribution of the promoter on the catalyst particles is obtained by applying the promoter solution to a catalyst which is blanketed in a gas that is soluble in the promoting solution. In so doing, we displace the air or other insoluble gas films and any adsorbed insoluble gases on and in the pores of the catalyst particle to be treated with the impregnating or promoting solution. Having replaced the insoluble gas with a soluble gas, the catalyst particle is permeated with the soluble or reactive gas, which is in turn readily replaced by the treating fluid. Suitable impregnating compounds for iron synthesis catalysts are soluble alkali metal salts such as, for example, potassium or sodium carbonate, chloride, fluoride, hydroxide, nitrate, or the like.

Among the soluble gases which may be used are carbon dioxide; hydrogen halides, such as hydrogen fluoride and hydrogen chloride; nitrogen compounds, such as ammonia, low-boiling amines and nitrogen oxides; and, in general, gases which are readily soluble in the impregnating solution. In some instances acidic sulfur-containing compounds, such as hydrogen sulfide, sulfur dioxide, sulfur trioxide and the like, may be used with catalysts not poisoned by such sulfur compounds. Carbon dioxide is particularly useful where the impregnating solution is alkaline, and ammonia is adaptable where the promoting vehicle or solution is slightly alkaline or acid.

It is contemplated that we may apply the soluble alkali metal compound as a solution of a soluble salt or base of the promoting alkali metal whereby the gas reacts with the dissolved salt and is itself dissolved by the liquid phase. For example, when carbon dioxide is the blanketing gas and potassium hydroxide the alkali metal compound, there is a reaction to produce potassium carbonate, and when hydrogen fluoride is the blanketing gas, potassium hydroxide reacts to produce potassium fluoride.

Acid alkali metal impregnating agents for reaction with ammonia may also include the acid salts of dibasic acids, such as oxalic, malonic, fumaric, phthalic and the like. When using the latter group of salts, however, the impregnation is preferably carried out at elevated temperatures so as to control precipitation of neutral salts which may be of low solubility.

In any of the above modifications, however, a surface-active agent may be added to the treating solution for the purpose of enhancing the uniform distribution of the promoting compound on the catalyst particles. Likewise, the liquid phase may comprise, in addition to the surface-active agent, a substantial proportion of an alcohol such as cyclohexanol. In that event, a blanketing gas which is soluble in the alcohol may be used.

When the catalyst is permeated with a soluble gas in accordance with our invention, the impregnating solution dissolves the permeating gas, which permits the impregnating solution to contact the catalyst surface uniformly and completely. The absorption of the gas by the solution creates a driving force which causes the impregnating solution to enter the pores of the catalyst to the same extent that the contacting synthesis gas would ordinarily enter. Hence the impregnating component is more securely and more uniformly carried by the extended contacting catalyst surface and a catalyst of superior activity and selectivity is thereby produced.

Tests have been made to determine the effect of a $CO_2$ atmosphere on the efficiency of the impregnation process. Three tests were made simultaneously, each using 600 cc. of finely-divided catalyst in a 1000 cc. cylinder and 256 cc. of an aqueous solution of $K_2CO_3$. Two of the samples were under an atmosphere of air and the third under an atmosphere of $CO_2$, i. e., the air had been displaced by the carbon dioxide.

The impregnating solution was poured over the catalyst. In the case of the catalyst under the $CO_2$ blanket, the catalyst was completely wetted within about fifteen minutes. It required nearly three hours for the catalyst under the atmosphere of air to become wetted by the solution. Displacement of air was evident by bubbles coming up through the layer of impregnating solution. On the other hand, there was no bubbling in the case of the $CO_2$ blanket, all of the gas within the catalyst mass being dissolved in the aqueous solution of the promoter.

Examination of the wetted samples revealed that between about 10 and 20% of the catalyst under the air atmosphere remained perfectly dry, whereas that under the $CO_2$ blanket was wetted throughout. The efficiency of the impregnation of the catalyst with the $CO_2$ blanket is clearly demonstrated by these tests.

Although the impregnating solution on all three samples included a wetting agent, i. e., 0.25% of aerosol OT (which comprises dioctyl sodium sulfosuccinate plus water and a mutual solvent), the test clearly demonstrated that as between an air atmosphere and a soluble gas atmosphere, the extent and uniformity of wetting was far greater in the presence of the soluble gas blanket.

In preparing a catalyst in accordance with our invention, it is desirable to remove as completely as possible the insoluble gases adsorbed by the catalyst which, if allowed to remain, would obstruct the impregnation of the catalyst with the promoter solution. Displacement of insoluble gases by soluble gases can ordinarily be effected by diffusing the soluble gas into the catalyst. However, diffusion can be accelerated by increasing the temperature, by varying the pressure—for example, in a fluctuating manner—or by subjecting the catalyst to a vacuum before or during the exposure to the soluble gas.

It is also contemplated that by partial or complete reduction of the catalyst before impregnation the promoting operation will be improved. Thus, the increased porosity of the catalyst particle resulting from the reduction of the iron oxide will permit the impregnating solution to enter the depths of the particle more readily.

We have found the treatment of the catalyst under the conditions generally set forth immediately above have resulted in the maintenance, over an extended period of time, of catalyst beds having high fluid densities. The catalyst obtained by such treatment as outlined above also gave improved yields of oil-soluble oxygenated organic compounds. Thus, in treating the catalyst, in connection with this particular phase of our invention, a finely-divided iron oxide such as, for example, that obtained from the oxide film known as iron mill scale, is first subjected to reduction in an atmosphere of hydrogen, said iron oxide previously having a relatively small quantity, i. e., from about 0.2 to about 0.6 weight percent, of an alkaline promoter deposited thereon so that after such reduction step and during the main promotion operation the catalyst may be handled more easily without immediate danger of extensive oxidation thereof. The reduction step is effected in a conventional hydrocarbon synthesis reactor, generally at pressures of from about 150 to 300 p. s. i. g. at temperatures ranging from about 200° to 700° F. and at linear velocities not in excess of 0.8 to 1.0 feet per second.

This operation is generally continued until the iron content of the reduced material is at least 75 to 80 weight percent. While the catalyst, by reduction of the latter to the aforesaid iron content prior to promotion, does possess the favorable fluidization characteristics and the ability to produce improved yields of oil-soluble chemicals as hereinafter discussed, we normally prefer, for better results, to continue reduction until the concentration of iron is at least 90 to 95 weight percent.

After reduction of the catalyst appears to be complete, as may be evidenced by the disappearance of water in the tail gas, treatment with hydrogen ordinarily should be continued for a period of from six to ten hours. The reduced catalyst is thereafter withdrawn from the reactor and placed in a suitable bomb under hydrogen pressure. The catalyst is then transferred to a rotary mixing drier where a solution of the alkaline promoter is poured over the catalyst in an amount sufficient to cover the latter. The contents of the rotary mixer are maintained under a positive $CO_2$ pressure of about 5 to 10 p. s. i. throughout the impregnation step. After impregnation and drying, the catalyst generally contains approximately 2.0 weight percent promoter (calculated as the alkali metal oxide) based on the iron. The impregnated catalyst is then cooled in a $CO_2$ atmosphere and sealed until ready for use.

The synthesis of hydrocarbons may thereafter be effected by introducing into a suitable reactor catalyst prepared and treated as described immediately above and allowing said catalyst, in the form of a fluidized bed, to contact synthesis gas containing hydrogen and carbon monoxide in known proportions. Pressures may range from about 250 to 450 p. s. i. g., for example, 350 p. s. i. g., and temperatures of from about 550° to about 675° F. may be employed. Space velocities ranging from about 3.0 to about 5.0 S. C. F. H. Co/lb. iron are generally preferable. However, space velocities different from the prescribed range may be used. Recycle ratios of from 1.0 to about 2.0 are ordinarily preferred.

Our invention will be illustrated further by the following specific example demonstrating the favorable fluidization characteristics and relatively high proportions of oil-soluble chemicals produced when employing iron hydrocarbon synthesis catalysts promoted in the manner described and claimed herein.

EXAMPLE 1

A 100-pound portion of finely-divided iron mill scale was impregnated with an aqueous 15 weight percent potassium carbonate solution to give an alkali content of 0.33 weight percent $K_2O$ based on iron. The resulting catalyst was then mixed and dried at a temperature of about 225° F. in a rotary drier. Thereafter, the catalyst was charged to a hydrocarbon synthesis reactor twenty feet long and having an I. D. of eight inches. Initial hydrogen pressure in the reactor was maintained at 150 p. s. i. g. at a temperature below 200° F. The table below indicates the feed rates employed and the various conditions of pressure, temperature and linear velocities used throughout the reduction step.

| Time, Hours | Pressure, p. s. i. g. | Temp., ° F. | $H_2$—S. C. F. H. | L. V., ft./sec. |
| --- | --- | --- | --- | --- |
| 0 | 150 | 200 | 6,000 | 0.6 |
| 12 | 150 | 600 | 3,800 | 0.6 |
| 13 | 150 | 700 | 3,800 | 0.6 |
| 24 to end | 250 | 700 | 5,500 | 0.6 |

After reduction appeared to be complete, the introduction of hydrogen was continued for a period of about six hours. Subsequent analysis of the reduced catalyst showed it to have an iron content of 98.2 percent. The reduced catalyst thus obtained was next transferred, in an atmosphere of hydrogen, to a suitable rotary mixing drier where it was impregnated with an aqueous 15 weight percent potassium carbonate solution to a $K_2O$ content of 1.69 weight percent based on iron. During the impregnation step, the rotary mixer was maintained under a positive $CO_2$ pressure of about ten pounds. As a precaution against contact of the catalyst with air dissolved in the impregnating solution, the latter was boiled prior to introduction thereof into the mixer. After impregnation and drying, the catalyst was maintained under a positive $CO_2$ pressure until ready for use.

The particle size of the catalyst before and after reduction is indicated below.

| | Particle Size—Mesh | | | | |
| --- | --- | --- | --- | --- | --- |
| | +100 | −100 +140 | −140 +200 | −200 +325 | −325 |
| Before reduction, wt. percent | 1.5 | 36.4 | 26.4 | 27.2 | 8.6 |
| Final catalyst, wt. percent | 0.3 | 42.6 | 30.3 | 17.5 | 9.3 |

Twenty-five pounds of the catalyst prepared as described above was next placed into a hydrocarbon synthesis reactor twenty feet long having an I. D. of two inches. Synthesis was thereafter initiated under the following conditions:

*Table I*

| Period | Activation | Synthesis |
|---|---|---|
| Hours | 0–15 | 15–end |
| Temperature, °F | 600 | 650 |
| Fresh feed $H_2$:CO ratio ($CO_2$=0%) | 1.85–1.90 | |
| System exit pressure, lb./sq. in | 400 | |
| Fresh feed rate, S. C. F. H | 200 | 250 |
| Recycle ratio | 1.8 | 1.0 |
| Recycle rate, S. C. F. H | 360 | 250 |
| Space velocity, S. C. F. H., CO (FF)/lb. Fe inventory | 4.0 | 5.0 |
| Linear velocity, ft./sec | 0.55 | 0.51 |

The results obtained while operating under the conditions set forth immediately above are indicated in the table below:

*Table II*

| Test period no | 1 | 2 | 3 | 4 | 5 | 6 |
|---|---|---|---|---|---|---|
| Hours | 24 | 40 | 71 | 111 | 161 | 165 |
| Water-soluble chemicals, wt. percent* | 7.6 | 7.2 | 7.5 | 7.3 | 5.6 | 6.7 |
| Oil-soluble chemicals, wt. percent | 6.7 | 7.4 | 8.4 | 9.8 | 8.7 | 8.7 |
| Total feed, percent CO conversion | 92.0 | 91.7 | 92.6 | 95.9 | 84.2 | 93.4 |
| Selectivity to: | | | | | | |
| $CO_2$ | 16.4 | 15.4 | 15.3 | 14.0 | 15.4 | 15.7 |
| $C_1+C_2$ | 21.2 | 22.7 | 18.4 | 18.5 | 21.1 | 21.5 |
| $C_3+$** | 62.3 | 61.9 | 66.1 | 67.5 | 63.5 | 62.7 |
| Fluid density—lbs. Fe/cu. ft | 131 | 147 | 141 | 140 | 137 | |

*Chemicals in water stream.
**Includes hydrocarbons and all chemicals.

EXAMPLE 2

In a second run employing conditions identical in all material respects with those used in Example 1 except for the fact that the catalyst was promoted with $K_2O$ prior to reduction, i. e., conventional procedure, hydrocarbon synthesis was effected with the results shown below. The $K_2O$ content of the catalyst was 1.64 weight percent based on iron.

*Table III*

| Test period no | 1 | 2 | 3 | 4 |
|---|---|---|---|---|
| Hours | 18 | 69 | 165 | 212 |
| Water-soluble chemicals, wt. percent* | 8.3 | 7.4 | 7.3 | 7.6 |
| Oil-soluble chemicals, wt. percent | 5.7 | 6.6 | 6.8 | 6.8 |
| Total feed, percent CO conversion | 63.6 | 83.9 | 78.4 | 78.1 |
| Selectivity, percent of converted CO to: | | | | |
| $CO_2$ | 19.5 | 14.2 | 14.6 | 15.0 |
| $C_1+C_2$ | 18.5 | 19.2 | 21.1 | 21.1 |
| $C_3+$** | 53.0 | 68.6 | 56.3 | 55.4 |
| Fluid density—lbs. Fe/cu. ft | 90.0 | 86.0 | 95.0 | 93.0 |

*Chemicals in water stream.
**Includes hydrocarbons and all chemicals.

From the foregoing examples it may be seen that with the catalyst promoted in accordance with the procedure of our invention the selectivity to oil-soluble chemicals was substantially greater (approximately thirty percent) than that obtained with the conventionally-promoted catalyst of Example 2. It should further be noted that the aforesaid gain in oil-soluble chemicals obtained in Example 1 was achieved without any decrease in the normal yield of water-soluble chemicals. Likewise, it is to be noted that appreciably higher total feed CO conversion was obtained in Example 1 than was secured under the conditions of Example 2. Also, in the run on which Example 1 is based relatively low production of $CO_2$ and light hydrocarbons was observed. A still further advantage obtained by employing catalysts of the type used in Example 1 is seen in the accompanying graph where fluid density is plotted versus percent carbon and wax deposition. With respect to resistance to carbon deposition over extended periods of time, curve A is based on the fluidization characteristics of conventionally-promoted mill scale catalysts of the type used in Example 2 and employed in a two-inch reactor of the design generally referred to herein. Curve B is based on data taken from a run in an eight-inch I. D. reactor having a reaction zone twenty feet long using conventionally-promoted mill scale catalysts. Normally, for a given catalyst, better fluidization is experienced in the eight-inch reactor than in a two-inch reactor of equivalent length owing to the greater rate of catalyst contamination with carbon and wax which occurs in the two-inch reactor because of higher conversion. Thus, it may be seen from these curves that at equal carbon and wax contents the fluid density of the catalyst in the two-inch reactor is substantially lower than that prevailing in the eight-inch reactor under otherwise equivalent conditions. Curve C, however, is based on data taken from Example 1 reported above in which the catalyst was reduced prior to the major promotion step, in accordance with the process of our invention. From this curve it is seen that not only is the carbon and wax deposition much less than was experienced in the runs on which curves A and B are based, but the fluid density of the catalyst is substantially higher than that observed in either of the previously-described runs. For these separate runs in which synthesis conditions were substantially identical, the fluidization characteristics and resistance to carbon and wax deposition exhibited by the catalyst prepared in accordance with our invention (curve C) are considered to be highly unexpected. Curve A is based on data taken over a period of 150 hours, the first analysis being taken at the end of 50 hours. Curve B is based on data taken over a 630-hour period, the first analysis being at the end of 120 hours. Curve C is based on data taken over a 165-hour period, the first analysis being at the end of 30 hours.

While our invention has been described in connection with specific examples enumerated above, it should be understood that it is not limited thereto. The data appearing in these examples clearly indicate that hydrocarbon synthesis catalyst treated in accordance with the process of our invention possesses extremely desirable operating characteristics as well as the ability to give high total feed carbon monoxide conversions with high selectivities to the desired class or classes of oxygenated chemicals. Likewise, it will be appreciated that although we have described the application of our invention to catalysts derived from iron mill scale, it is of course understood that our process is similarly applicable to the preparation of iron hydrocarbon synthesis catalysts derived from other sources.

This is a continuation-in-part application of our co-pending application U. S. Serial Number 28,755 filed May 22, 1948, now abandoned.

We claim:

1. In a process for preparing an iron hydrocarbon synthesis catalyst having improved fluidization characteristics and selectivity to oxygenated organic chemicals, the steps which comprise subjecting finely-divided iron particles, wherein a major portion of said particles are in the form of a lower iron oxide, to reduction with hydrogen at a temperature range from about 200° to about 800° F. and at elevated hydrogen pressures, continuing reduction until the iron content of the reduced material is at least about 75 to 80 weight percent, and thereafter depositing a water soluble inorganic alkali metal promoter compound on said reduced material in an amount sufficient to yield a final promoter concentration (as the metal oxide) of from about 0.3 to about 2.0 weight percent based on iron.

2. In a process for preparing an iron hydrocarbon synthesis catalyst having improved fluidization characteristics and selectivity to oxygenated organic chemicals, the steps which comprise subjecting finely-divided iron particles, wherein a major portion of said particles are in the form of a lower iron oxide, to reduction with hydrogen at a temperature range from about 200° to about 800° F. and at elevated hydrogen pressures, continuing reduction until the iron content of the reduced material is at least about 90 to 95 weight percent, and thereafter depositing a water soluble inorganic alkali metal promoter compound on said reduced material in an amount sufficient to yield a final promoter concentration (as the metal oxide) of from about 0.3 to about 2.0 weight percent based on iron.

3. The process of claim 2 in which hydrogen pressures of from about 150 to about 550 p. s. i. g. are employed.

4. The process of claim 2 in which temperatures of from about 675° to about 725° F. and pressures of from about 200 to about 300 p. s. i. g. are employed.

5. The process of claim 4 in which finely-divided iron mill scale is employed as the catalyst source.

6. The process of claim 4 in which the alkali metal oxide promoter employed is potassium oxide.

7. In a process for preparing an iron hydrocarbon synthesis catalyst having improved fluidization characteristics and selectivity to oxygenated chemicals, the steps which comprise depositing on finely-divided iron particles, wherein a major portion of said particles are in the form of a lower iron oxide, an alkali metal oxide in a concentration of from about 0.2 to about 0.6 weight percent, based on iron, thereafter subjecting said particles to reduction with hydrogen at temperatures ranging from about 200° to 800° F. and at elevated hydrogen pressures, continuing reduction until the iron content of the reduced material is at least about 90 to 95 weight percent, and thereafter depositing an alkali metal promoter on said reduced material in an amount sufficient to yield a final promoter concentration (as the metal oxide) of from about 0.3 to about 2.0 weight percent based on iron.

8. The process of claim 7 wherein the reduction step is effected at a temperature range of from about 675° to 725° F. and at pressures of from about 200 to about 300 p. s. i. and the finely-divided iron particles employed are derived from iron mill scale.

9. The process of claim 8 in which potassium oxide is the alkali metal promoter employed.

10. In a process for preparing an iron hydrocarbon synthesis catalyst having improved fluidization characteristics and selectivity to oxygenated organic chemicals, the steps which comprise subjecting finely-divided iron particles, wherein a major portion of said particles are in the form of a lower iron oxide, to reduction with hydrogen at a temperature range from about 200° to about 800° F. and at elevated hydrogen pressures, continuing reduction until the iron content of the reduced iron particles is at least about 90 to 95 weight percent, thereafter permeating said reduced material with a water-soluble gas and contacting the permeated reduced iron particles with a quantity of an aqueous solution of a water soluble inorganic alkali metal promoter compound whereby the water-soluble gas permeating said reduced iron particles is dissolved in the aqueous solution and a uniform aqueous film of the promotor metal compound is deposited on and within said reduced iron particles.

11. The process of claim 10 in which the water-soluble gas is $CO_2$ and the alkali metal promoter compound is potassium carbonate.

12. In a process for preparing an iron hydrocarbon synthesis catalyst having improved fluidization characteristics and selectivity to oxygenated organic chemicals, the steps which comprise subjecting finely-divided iron particles, wherein a major portion of said particles are in the form of a lower iron oxide, to reduction with hydrogen at a temperature range from about 200° to about 800° F. and at elevated hydrogen pressures, continuing reduction until the iron content of the reduced iron particles is at least about 90 to 95 weight percent, thereafter blanketing said reduced particles with carbon dioxide, contacting the blanketed reduced particles with an aqueous solution of an alkali metal promoter compound whereby the carbon dioxide on the said reduced particles is adsorbed by said solution and is replaced by a uniform film of the aqueous solution of said alkaline promoter metal compound.

13. In a process for preparing an iron hydrocarbon synthesis catalyst having improved fluidization characteristics and selectivity to oxygenated organic chemicals, the steps which comprise subjecting finely-divided iron particles, wherein a major portion of said particles are in the form of a lower iron oxide, to reduction with hydrogen at a temperature range from about 200° to about 800° F. and at elevated hydrogen pressures, continuing reduction until the iron content of the reduced iron particles is at least about 90 to 95 weight percent, thereafter maintaining the resulting finely-divided reduced iron particles in an atmosphere of a water-soluble gas, withdrawing the bulk of the soluble gas from the mass of said reduced iron particles and contacting the latter with an aqueous solution of an alkali metal promoter compound whereby the aqueous solution of the promoter displaces the occluded soluble gas from said reduced iron particles and thoroughly wets the catalyst surface.

14. The process of claim 13 in which the water-soluble gas is $CO_2$ and the alkali metal promoter compound is potassium carbonate.

References Cited in the file of this patent

UNITED STATES PATENTS

| | | |
|---|---|---|
| 1,225,755 | Bosch et al. | May 15, 1917 |
| 2,481,217 | Hemminger | Sept. 6, 1949 |
| 2,483,512 | Voorhies et al. | Oct. 4, 1949 |
| 2,496,343 | Gillespie | Feb. 7, 1950 |